Figure 1:
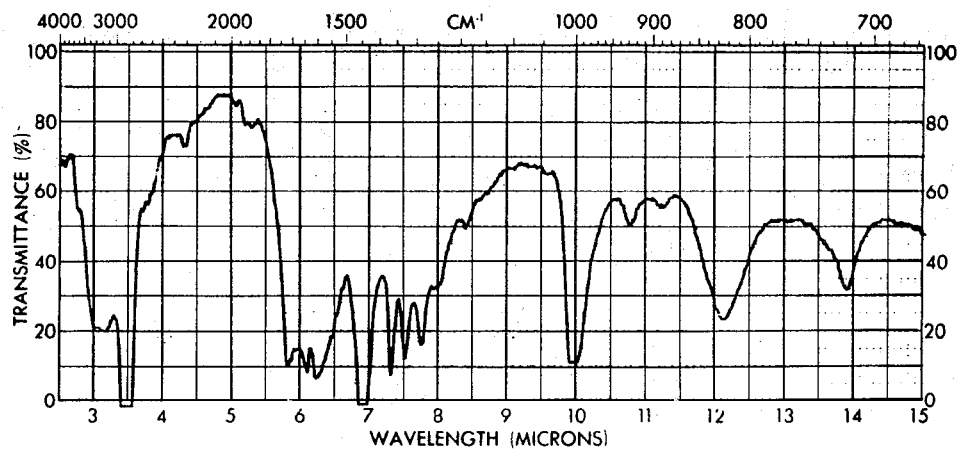

United States Patent
Smith, Jr.

[15] 3,689,515
[45] Sept. 5, 1972

[54] VANADYL OXALATE COMPOUNDS AND PROCESS FOR PRODUCING SAME
[72] Inventor: William Novis Smith, Jr., Exton, Pa. 19341
[73] Assignee: Foote Mineral Company, Exton, Pa.
[22] Filed: June 4, 1971
[21] Appl. No.: 150,055

[52] U.S. Cl............260/429 R, 252/431 C, 260/429 J
[51] Int. Cl................................................C07f 9/00
[58] Field of Search.......................260/429 R, 429 J

[56] References Cited

UNITED STATES PATENTS

| | | | |
|---|---|---|---|
| 979,887 | 12/1910 | Rehlander | 260/429 R |
| 1,914,557 | 6/1933 | Craver | 260/429 R |
| 3,018,255 | 1/1962 | Banks | 252/455 R |

OTHER PUBLICATIONS

Zolotavin et al. Th. Neorg. Khim (J. Inorg. Chem. U.S.S.R.) Vol. 1, No. 4, 1956, p. 101–107

*Primary Examiner*—Delbert E. Gantz
*Assistant Examiner*—A. P. Demers
*Attorney*—Howson and Howson

[57] ABSTRACT

Vanadyl oxalate compounds, particularly vanadyl oxalate monohydrate and vanadyl oxalate sesquihydrate, are prepared by reacting vanadium pentoxide with oxalic acid dihydrate or anhydrous oxalic acid in an acetic acid solvent system.

8 Claims, 3 Drawing Figures

VANADYL OXALATE COMPOUNDS AND PROCESS FOR PRODUCING SAME

BACKGROUND OF THE INVENTION

Vanadium containing compounds are widely used as oxidation catalysts. Typical catalysts are prepared by depositing vanadium containing compounds on a suitable support and activating the vanadium compounds by well known procedures. Aqueous solutions of vanadyl oxalate are frequently utilized to prepare vanadium containing catalysts, a typical catalyst prepared from vanadyl oxalate being described in U.S. Pat. No. 3,018,255. Vanadyl oxalate is particularly desirable for use in preparing such vanadium containing catalysts since, when activated by decomposition with heat, the vanadyl oxalate is converted to vanadium pentoxide or vanadium dioxide, the latter being formed if the thermal decomposition is carried out in the absence of oxygen, with carbon dioxide and water being liberated. The catalyst formed is thus free of extraneous anions or cations.

Heretofore, vanadyl oxalate compounds have been prepared by a fusion reaction between vanadium pentoxide and oxalic acid or by reacting these compounds in water at elevated temperatures. These procedures are described in articles by Sathyanorayana et al. in the *Journal of Inorganic and Nuclear Chemistry*, Volume 27, p. 297 (1965) and Satapathy et al. in the *Indian Journal of Chemistry*, Volume 1, p. 757 (1963). The fusion reaction produces a fused mass of vanadyl oxalate dihydrate which must be ground before it can be conveniently utilized. When vanadium pentoxide and oxalic acid are reacted in water, an aqueous solution of vanadyl oxalate is initially produced. Recovery of the solid vanadyl oxalate dihydrate from the aqueous solution, which is usually accomplished by solvent evaporation, is time consuming since the vanadyl oxalate dihydrate crystallizes from the solution at a very slow rate. Thus, neither of these processes produces vanadyl oxalate compounds in a solid, particulate form which can be immediately utilized in, for example, catalyst manufacturing processes. Other methods for producing vanadyl oxalate compounds are disclosed in U.S. Pat. Nos. 979,887, 1,914,557, and 3,025,132. In these processes vanadyl oxalate is normally isolated and recovered in hydrated forms such as vanadyl oxalate dihydrate, trihydrate, or tetrahydrate.

It is apparent that the multihydrated vanadyl oxalate compounds are undesirable since shipping or transporting of these materials from their producer to a catalyst manufacturer involves the expenses of shipping the large amounts of water of hydration associated with the vanadyl oxalate. Therefore, a need exists for a process for producing vanadyl oxalate compounds with low water of hydration moieties associated therewith.

Accordingly, it is an object of this invention to provide a process for preparing vanadyl oxalate compounds with little water of hydration associated therewith.

It is a further object of this invention to produce vanadyl oxalate monohydrate and vanadyl oxalate sesquihydrate.

A still further object of this invention is to provide a convenient and economical process for producing solid vanadyl oxalate compounds directly in particulate form without the need of evaporation of solvents.

DESCRIPTION OF THE INVENTION

According to this invention, the above-described objects and advantages are obtained in a process for preparing vanadyl oxalate compounds which comprises reacting about one mol of vanadium pentoxide with from about 3 to about 3.5 mols of an organic acid selected from the group consisting of oxalic acid dihydrate and anhydrous oxalic acid in a solvent consisting essentially of acetic acid containing not more than 30 percent, by weight, water. In addition to the usual hydrated forms of vanadyl oxalate, the novel compounds vanadyl oxalate monohydrate and vanadyl oxalate sesquihydrate are produced by this process.

Figure 2:
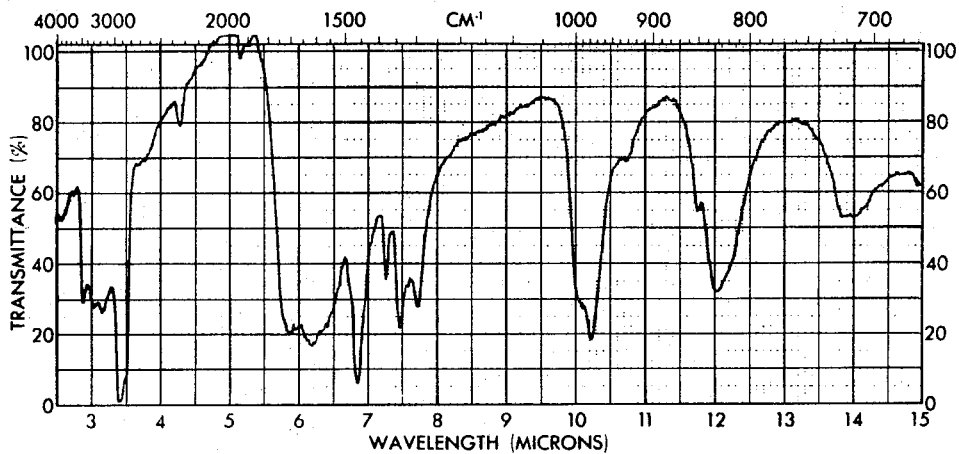
Figure 3:
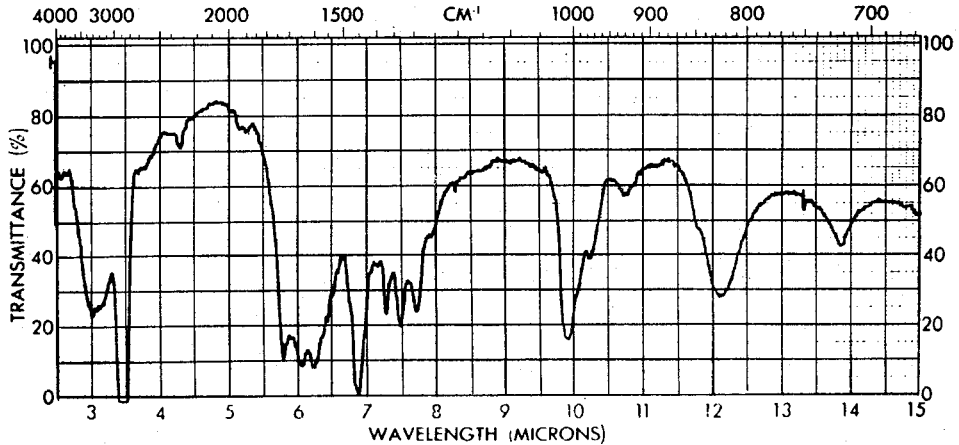

In the appended drawings,

FIGS. 1 to 3 are photographs of infra-red absorption curves depicting specific infra-red absorption peaks exhibited by the compounds vanadyl oxalate monohydrate, vanadyl oxalate sesquihydrate, and vanadyl oxalate dihydrate in a hydrocarbon mull.

The reaction between vanadium pentoxide and oxalic acid in an acetic acid solvent system to produce vanadyl oxalate compounds proceeds according to the following equations:

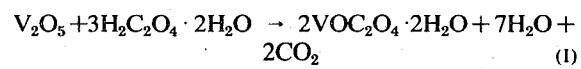

$$V_2O_5 + 3H_2C_2O_4 \cdot 2H_2O \rightarrow 2VOC_2O_4 \cdot 2H_2O + 7H_2O + 2CO_2 \qquad (I)$$

$$VOC_2O_4 \cdot 2H_2O \rightarrow VOC_2O_4 \cdot H_2O + H_2O$$

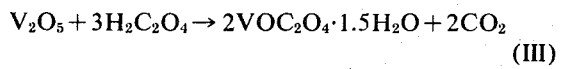

$$V_2O_5 + 3H_2C_2O_4 \rightarrow 2VOC_2O_4 \cdot 1.5H_2O + 2CO_2 \qquad (III)$$

The vanadium pentoxide reactant employed in the above equations can be any commercially available form of $V_2O_5$, preferably in finely-divided form, that is, having a particle size of about $-100$ mesh (Tyler Series).

The other principal reactant in the illustrated reactions is oxalic acid. In the reaction with vanadium pentoxide to produce vanadyl oxalate, the oxalic acid serves not only as a reducing agent, but also as a source of the oxalate anion. Oxalic acid is normally available as the dihydrate and it is in this form that the present process generally utilizes this reactant. It has been found, however, that anhydrous oxalic acid is preferred when the process is utilized to produce vanadyl oxalate sesquihydrate.

The reaction between vanadium pentoxide and oxalic acid stoichiometrically requires 3 mols of oxalic acid for each mol of vanadium pentoxide. The reaction preferably will be carried out with the stoichiometric proportions of reactants; however, the reaction will proceed with a combination of reactants within the range of from about 3 to about 3.5 mols of oxalic acid per mol of vanadium pentoxide. Excess oxalic acid reduces the reaction time required to produce vanadyl oxalate monohydrate.

The present process is carried out in a solvent consisting essentially of acetic acid containing not more than 30 percent, by weight, water. Hydrated forms of vanadyl oxalate have been found to be almost completely insoluble in glacial acetic acid. Thus, acetic acid is an ideal solvent for the reaction between vanadium pentoxide and oxalic acid, since the hydrated forms of vanadyl oxalate can be easily recovered in a dry powder. The preferred form of acetic acid utilized is commercially available glacial acetic acid which contains about 0.5 percent water. More dilute acetic acid solutions, such as those containing up to as much as 30 percent, by weight, of water may, however, be utilized as the solvents in this process. It has also been found that the presence of water in the acetic acid solvent increases the rate of reaction between vanadium pentoxide and oxalic acid. However, since the vanadyl oxalate compounds are water soluble, solvent systems containing large amounts of water, e.g. greater than 30 percent, by weight, are avoided to eliminate the possibility of loss of product to the solvent. It has been found that acetic anhydride, and acids such as formic acid and propionic acid are not useful solvents for this process.

In carrying out the process, the vanadium pentoxide and oxalic acid are mixed in the acetic acid solvent and the mixture is heated. The reaction may be carried out at any temperature between 50° C. and reflux, however, the reaction rate becomes significant at about 70°–75 C. The preferred temperature range for the reaction is from about 100° to about 120° C. Lower reaction temperatures favor the formation of vanadyl oxalate dihydrate, but the reaction rate is quite slow below 70° C.

The reaction mixture is heated for from about 2 to about 5 hours, the duration of the reaction determining in large measure the particular hydrated form of vanadyl oxalate recovered as the product of the reaction. For example, if the reaction between stoichiometric proportions of vanadium pentoxide and oxalic acid dihydrate is carried out in glacial acetic acid at reflux for from one to two hours, the product will be vanadyl oxalate dihydrate which has a characteristic peacock blue color. Heating the same reactants under the same conditions for about three hours produces a greenish-blue mixture by analysis found to be about 78 percent vanadyl oxalate dihydrate and 22 percent vanadyl oxalate monohydrate. If reacted for about four hours, this reaction produces a mixture found to be about 11 percent vanadyl oxalate dihydrate and 89 percent vanadyl oxalate monohydrate, and if the reaction is carried out for at least about 5 hours, the product analyzes 99.5 percent vanadyl oxalate monohydrate, a bright blue compound. It is thus apparent that the length of reaction time is one factor determining the particular hydrated form of vanadyl oxalate recovered in this process, another factor being the amount of water in the reaction system. Thus, for example, if the solvent system initially contains about 5 percent, by weight, water, the vanadyl oxalate monohydrate can be formed in about 3 ½ hours.

Vanadyl oxalate sesquihydrate is prepared by reacting vanadium pentoxide with anhydrous oxalic acid at reflux for at least about 5 hours. As seen in equation III, the total amount of water in this reaction is low in comparison to that found in the reactions producing the dihydrated and monohydrated forms of vanadyl oxalates. The sesquihydrated form of vanadyl oxalate, which has a pale blue-gray color, may also be obtained by conversion of vanadyl oxalate dihydrate by drying at 100° C. under 0.1 mm Hg for 15 hours.

Following the reaction, the reaction mixture is cooled and the vanadyl oxalate compound which is formed is isolated from the reaction mixture by filtration and the residue is dried to remove any traces of acetic acid, advantageously under a vacuum of from about 0.1 to about 1 mm of mercury, at a temperature of from about 80° to about 100° C. The hydrated forms of vanadyl oxalate produced by this method contain less water of hydration and proportionally more vanadyl oxalate than those produced by previous methods. Accordingly, use of vanadyl oxalate monohydrate or vanadyl oxalate sesquihydrate in preparing vanadium containing catalysts is especially advantageous due to the increased vanadium content of these compounds.

The novel compound vanadyl oxalate monohydrate is recovered as a blue crystalline powder which exhibits a strong infra-red absorption peak in a hydrocarbon mull at 985 cm$^{-1}$ as depicted in FIG. 1. Vanadyl oxalate sesquihydrate is recovered as a pale blue-gray crystalline powder which exhibits a strong infra-red absorption peak in a hydrocarbon mull at 980 cm$^{-1}$ with a small shoulder at 1010 cm$^{-1}$ as depicted in FIG. 2. In contrast, as shown in FIG. 3, vanadyl oxalate dihydrate exhibits a strong absorption peak in a hydrocarbon mull at 1,010 cm$^{-1}$. The vanadyl oxalate compounds are soluble in water and alcohol and are deliquesent to various degrees. These hydrated forms of vanadyl oxalate may be used to produce the vanadium containing catalysts discussed above. In addition, they may be utilized to produce selective oxidation catalysts useful in commercial processes such as the conversion of 2-butene to maleic anhydride.

The following examples are set forth as illustrative of this invention:

EXAMPLE 1

A round-bottom, (three-necked, 500 ml. flask is equipped with a stirrer, thermometer, and reflux condenser. The flask is charged with 30 g. vanadium pentoxide, 63.9 g. of oxalic acid dihydrate and 252 ml. of glacial acetic acid. The reaction mixture is heated to a temperature maintained between 108° and 118° C. for 2 hours, cooled to room temperature, filtered, and the filtrate is discarded. The solid is dried at 80° C. under a vacuum of 0.25 mm of Hg for 5 hours. The peacock blue product, vanadyl oxalate dihydrate [$VOC_2H_4 \cdot 2H_2O$], weighs 61.1 g. for a yield of 99.6 percent. The vanadium analysis is 26.7 percent and the oxalate is 46.3 percent, balance water. Vanadyl oxalate dihydrate exhibits an infra-red absorption peak in a hydrocarbon mull of 1,010 cm$^{-1}$ as shown in FIG. 1.

EXAMPLE 2

Utilizing the apparatus and the reactants of Example 1, the mixture is heated to a temperature maintained between 108° and 118° C. for 3 hours, cooled to room temperature, filtered, and the filtrate is discarded. The solid is dried at 80° C., under a vacuum of 0.25 mm of Hg for 3.5 hours. The product weighs 60.3 g for a yield of 98 percent. The product is a greenish-blue mixture of 78 percent, by weight, vanadyl oxalate dihydrate and 22 percent, by weight, vanadyl oxalate monohydrate. The vanadium analysis is 27.4 percent and the oxalate is 47.9 percent, balance water.

EXAMPLE 3

Utilizing the apparatus and the reactants of Example 1, the mixture is heated to a temperature maintained between 108° and 118° C. for four hours, cooled to room temperature, filtered, and the filtrate is discarded. The solid is dried at 80° C. under a vacuum of 0.25 mm of Hg for 5 hours. The product weighs 56.0 g for a yield of 97 percent. The product is a mixture of 11 percent, by weight, vanadyl oxalate dihydrate and 89 percent, by weight, vanadyl oxalate monohydrate. The vanadium analysis is 29.1 percent, and the oxalate is 49.6 percent, balanced water.

EXAMPLE 4

Utilizing the apparatus and reactants of Example 1, the mixture is heated to a temperature maintained between 108° and 118° C. for 5 hours, cooled to room temperature, filtered, and the filtrate is discarded. The solid is dried at 90° C. under a vacuum of 0.15 mm of Hg for 5 hours. The product weighs 57.2 g for a yield of 99.5 percent. The vanadium analysis is 29.2 percent and the oxalate is 50.8 percent, balance water. The bright blue product is vanadyl oxalate monohydrate [$VOC_2O_4 \cdot H_2O$] which exhibits an infra-red absorption peak in a hydrocarbon mull of 985 cm$^{-1}$ as shown in FIG. 2.

EXAMPLE 5

Utilizing the apparatus of Example 1, the flask is charged with 30 g. vanadium pentoxide, 75 g. oxalic acid dihydrate, 200 ml. glacial acetic acid, and 10 ml. of water. The reaction mixture is heated to a temperature maintained between 108° and 118° C. for 3.5 hours, cooled to room temperature, filtered, and the filtrate is discarded. The solid is dried at 80° C. under a vacuum of 1.0 mm Hg for 5 hours. The product, vanadyl oxalate monohydrate, weighs 55.2 g for a yield of 96.5 percent. The analysis for vanadium is 29.3 percent, and for oxalate is 50.4 percent, balance water. Vanadyl oxalate monohydrate exhibits an infra-red absorption peak in a hydrocarbon mull of 985 cm$^{-1}$ as shown in FIG. 2.

EXAMPLE 6

Utilizing the apparatus of Example 1, the flask is charged with 10 g. vanadium pentoxide, 50.2 g. anhydrous oxalic acid, and 70 ml. of glacial acetic acid. The reaction mixture is heated to a temperature maintained between 110° and 118° C. for 5 hours, cooled to room temperature, filtered, and the filtrate is discarded. The solid is dried at 80° C. under 0.03 mm Hg for 5 hours. The pale blue-gray product, vanadyl oxalate sesquihydrate [$VOC_2O_4 \cdot 1.5H_2O$], weighs 19.6 g. for a yield of 98 percent. The vanadium analysis was 27.5 percent and the oxalate is 46.7 percent, balance water. Vanadyl oxalate sesquihydrate exhibits an infra-red absorption peak in a hydrocarbon mull of 980 cm$^{-1}$ with a small shoulder at 1,010 cm$^{-1}$ as shown in FIG. 3.

What is claimed is:

1. A process for preparing vanadyl oxalate compounds which comprises reacting about one mol of vanadium pentoxide with from about 3 to about 3.5 mols of an organic acid selected from the group consisting of anhydrous oxalic acid and oxalic acid dihydrate in a solvent consisting essentially of acetic acid containing not more than 30 percent, by weight, water, over a period of from about 2 to about 5 hours.

2. A process according to claim 1 wherein said reaction is carried out at a temperature ranging from about 50° C. to about reflux.

3. A process according to claim 1 wherein about one mol of vanadium pentoxide is reacted with about three mols of oxalic acid dihydrate in glacial acetic acid at a temperature ranging from about 100° to about 120° C. for about 1 to about 2 hours to produce vanadyl oxalate dihydrate.

4. A process according to claim 1 wherein about one mol of vanadium pentoxide is reacted with about three mols of oxalic acid dihydrate in glacial acetic acid at a temperature ranging from about 110° to about 120° C. for at least about 5 hours to produce vanadyl oxalate monohydrate.

5. A process according to claim 1 wherein about one mol of vanadium pentoxide is reacted with about 3.5 mols of oxalic acid dihydrate in about 95 percent acetic acid at a temperature ranging from about 110° to about 120° C. for about 3.5 hours to produce vanadyl oxalate monohydrate.

6. A process according to claim 1 wherein about one mol of vanadium pentoxide is reacted with about three mols of anhydrous oxalic acid in glacial acetic acid at a temperature ranging from about 100° to about 120° C. for at least about 5 hours to produce vanadyl oxalate sesquihydrate.

7. Vanadyl oxalate monohydrate.

8. Vanadyl oxalate sesquihydrate.

* * * * *